United States Patent [19]

Brown

[11] Patent Number: 5,794,216
[45] Date of Patent: Aug. 11, 1998

[54] METHODS AND SYSTEM FOR DATA ACQUISITION IN A MULTIMEDIA REAL ESTATE DATABASE

[76] Inventor: Timothy Robert Brown, 3007 Deerpark Cir., Creswood, Ky. 40014

[21] Appl. No.: 502,389

[22] Filed: Jul. 14, 1995

[51] Int. Cl.[6] .................................................. G06F 17/60
[52] U.S. Cl. ............................................................ 705/27
[58] Field of Search ................................ 395/226, 227, 395/222, 210, 615, 612; 705/26, 27, 22, 28, 37

[56] References Cited

U.S. PATENT DOCUMENTS

| | | | |
|---|---|---|---|
| 4,429,385 | 1/1984 | Cichelli et al. | 370/92 |
| 4,635,136 | 1/1987 | Ciampa et al. | 386/64 |
| 4,870,576 | 9/1989 | Tornetta | 364/401 |
| 5,032,989 | 7/1991 | Tornetta | 364/401 |
| 5,146,548 | 9/1992 | Bijnagte | 395/117 |
| 5,235,680 | 8/1993 | Bijnagte | 395/161 |
| 5,317,680 | 5/1994 | Ditter, Jr. | 395/135 |
| 5,325,297 | 6/1994 | Bird et al. | 395/792 |
| 5,475,375 | 12/1995 | Barrett et al. | 340/825.31 |
| 5,559,707 | 9/1996 | DeLorme | 364/443 |
| 5,584,025 | 12/1996 | Keithley et al. | 395/615 |
| 5,592,375 | 1/1997 | Salmon et al. | 395/207 |

*Primary Examiner*—Donald E. McElheny, Jr.
*Attorney, Agent, or Firm*—Brooks & Kushman P.C.

[57] ABSTRACT

A device for storing information about a plurality of houses, for access by an application program executed on a computer or other like programmable apparatus, comprises a computer-readable storage medium and computer-readable data on the computer-readable storage medium. The computer-readable data is representative of a database containing textual information for each house, at least one exterior image for each house, at least one interior image for each house, and at least one parameter indicating a portion of the exterior image corresponding to the interior image for each house, all in a common database format. Methods, systems, and articles of manufacture for compiling information about a house on a computer-readable storage medium using a computer are disclosed.

27 Claims, 26 Drawing Sheets

| DATA FIELD | DATA TYPE | DESCRIPTION |
|---|---|---|
| Street | Text | House Data |
| Number | Text | House Data |
| Price | Number | House Data |
| Date | Text | House Data |
| L# | Text | House Data |
| Zone | Number | House Data |
| City | Text | House Data |
| County | Text | House Data |
| Subd | Text | House Data |
| Apx Sqf | Text | House Data |
| Zip | Text | House Data |
| E D Y/N | Text | House Data |
| Rooms | Text | House Data |
| Bed | Text | House Data |
| Bths | Text | House Data |
| Firplc | Text | House Data |
| Den | Text | House Data |
| Lndry | Text | House Data |
| Bmt Y/N | Text | House Data |
| Cars | Text | House Data |
| Air Y/N | Text | House Data |
| W/H Fuel | Text | House Data |
| Typ-Win | Text | House Data |
| R-Fact-W | Text | House Data |
| Acr | Text | House Data |
| Gas Y/N | Text | House Data |
| Heat-Fuel | Text | House Data |
| Heat-Type | Text | House Data |
| R-Factor-Ceil | Text | House Data |
| Foundation | Text | House Data |
| E/I Kit Y/N | Text | House Data |
| DinRm Y/N | Text | House Data |
| Great-Room Y/N | Text | House Data |
| Age | Text | House Data |
| Sewer Y/N | Text | House Data |
| CtyTx Rate | Text | House Data |
| St/Co Tx Rate | Text | House Data |
| Lotsize | Text | House Data |
| Elem | Text | House Data |
| Mid | Text | House Data |
| High | Text | House Data |
| Paroc | Text | House Data |
| Listed By | Text | House Data |
| Lst Realtor | Text | House Data |

FIG. 11a

| | | |
|---|---|---|
| Agt | Text | House Data |
| Res Ph | Text | House Data |
| Comm CA | Text | House Data |
| List Realtor # | Text | House Data |
| List Real Phone | Text | House Data |
| Vacant Y/N | Text | House Data |
| Pict1 HotSp1 | Text | HotSpot Coordinates For Front of House |
| Pict1 HotSp1 Pict | Number | HotSpot Picture Number |
| Pict1 HotSp2 Pict | Number | HotSpot Picture Number |
| Pict1 HotSp3 Pict | Number | HotSpot Picture Number |
| Pict1 HotSp4 Pict | Number | HotSpot Picture Number |
| Pict1 HotSp5 Pict | Number | HotSpot Picture Number |
| Pict1 HotSp6 Pict | Number | HotSpot Picture Number |
| Pict1 HotSp7 Pict | Number | HotSpot Picture Number |
| Pict1 HotSp8 Pict | Number | HotSpot Picture Number |
| Pict1 | OLE Object | Binary Picture Data |
| Pict1 Caption | Text | |
| Pict1 Available | Yes/No | Tag for checking if Picture is Available |
| Pict1 Thumb | OLE Object | Binary data of the pict for the Picture Carousel |
| Pict2 HotSp1 | Text | HotSpot Coordinates For Rear of House |
| Pict2 HotSp1 Pict | Number | HotSpot Picture Number |
| Pict2 HotSp2 Pict | Number | HotSpot Picture Number |
| Pict2 HotSp3 Pict | Number | HotSpot Picture Number |
| Pict2 HotSp4 Pict | Number | HotSpot Picture Number |
| Pict2 HotSp5 Pict | Number | HotSpot Picture Number |
| Pict2 HotSp6 Pict | Number | HotSpot Picture Number |
| Pict2 HotSp7 Pict | Number | HotSpot Picture Number |
| Pict2 HotSp8 Pict | Number | HotSpot Picture Number |
| Pict2 | OLE Object | Binary Picture Data |
| Pict2 Caption | Text | |
| Pict2 Available | Yes/No | Tag for checking if Picture is Available |
| Pict2 Thumb | OLE Object | Binary data of the pict for the Picture Carousel |
| Pict3 | OLE Object | Binary Picture Data |
| Pict3 Caption | Text | |
| Pict3 Available | Yes/No | Tag for checking if Picture is Available |
| Pict3 Thumb | OLE Object | Binary data of the pict for the Picture Carousel |
| Pict4 | OLE Object | Binary Picture Data |
| Pict4 Caption | Text | |
| Pict4 Available | Yes/No | Tag for checking if Picture is Available |
| Pict4 Thumb | OLE Object | Binary Picture Data |
| Pict5 | OLE Object | Binary Picture Data |
| Pict5 Caption | Text | |
| Pict5 Available | Yes/No | Tag for checking if Picture is Available |
| Pict5 Thumb | OLE Object | Binary Picture Data |
| Pict6 | OLE Object | Binary Picture Data |

FIG. 11b

| | | |
|---|---|---|
| Pict6 Caption | Text | |
| Pict6 Available | Yes/No | Tag for checking if Picture is Available |
| Pict6 Thumb | OLE Object | Binary Picture Data |
| Pict7 | OLE Object | Binary Picture Data |
| Pict7 Caption | Text | |
| Pict7 Available | Yes/No | Tag for checking if Picture is Available |
| Pict7 Thumb | OLE Object | Binary Picture Data |
| Pict8 | OLE Object | Binary Picture Data |
| Pict8 Caption | Text | |
| Pict8 Available | Yes/No | Tag for checking if Picture is Available |
| Pict8 Thumb | OLE Object | Binary Picture Data |
| Pict9 | OLE Object | Binary Picture Data |
| Pict9 Caption | Text | |
| Pict9 Available | Yes/No | Tag for checking if Picture is Available |
| Pict9 Thumb | OLE Object | Binary Picture Data |
| Pict10 | OLE Object | Binary Picture Data |
| Pict10 Caption | Text | |
| Pict10 Available | Yes/No | Tag for checking if Picture is Available |
| Pict10 Thumb | OLE Object | Binary Picture Data |
| Pict11 | OLE Object | Binary Picture Data |
| Pict11 Caption | Text | |
| Pict11 Available | Yes/No | Tag for checking if Picture is Available |
| Pict11 Thumb | OLE Object | Binary Picture Data |
| Pict12 | OLE Object | Binary Picture Data |
| Pict12 Caption | Text | |
| Pict12 Thumb | OLE Object | Binary Picture Data |
| Pict12 Available | Yes/No | Tag for checking if Picture is Available |
| Video Available | Yes/No | |
| Video | Text | |
| 1st Floor HotSp1 | Text | Coordinates for 1st Floorplan HotSpots |
| 1st Floor HotSp1 Pict | Number | HotSpot Picture Number |
| 1st Floor HotSp2 Pict | Number | HotSpot Picture Number |
| 1st Floor HotSp3 Pict | Number | HotSpot Picture Number |
| 1st Floor HotSp4 Pict | Number | HotSpot Picture Number |
| 1st Floor HotSp5 Pict | Number | HotSpot Picture Number |
| 1st Floor HotSp6 Pict | Number | HotSpot Picture Number |
| 1st Floor HotSp7 Pict | Number | HotSpot Picture Number |
| 1st Floor HotSp8 Pict | Number | HotSpot Picture Number |
| 1st Floor | OLE Object | Binary Picture Data |
| 1st Floor Available | Yes/No | Tag for checking if Picture is Available |
| 2nd Floor HotSp1 | Text | Coordinates for 2nd Floorplan HotSpots |
| 2nd Floor HotSp1 Pict | Number | HotSpot Picture Number |
| 2nd Floor HotSp2 Pict | Number | HotSpot Picture Number |
| 2nd Floor HotSp3 Pict | Number | HotSpot Picture Number |
| 2nd Floor HotSp4 Pict | Number | HotSpot Picture Number |
| 2nd Floor HotSp5 Pict | Number | HotSpot Picture Number |
| 2nd Floor HotSp6 Pict | Number | HotSpot Picture Number |
| 2nd Floor HotSp7 Pict | Number | HotSpot Picture Number |

FIG. 11c

| 2nd Floor HotSp8 Pict | Number | HotSpot Picture Number |
| --- | --- | --- |
| 2nd Floor | OLE Object | Binary Picture Data |
| 2nd Floor Available | Yes/No | Tag for checking if Picture is Available |
| 3rd Floor HotSp1 | Text | Coordinates for 3rd Floorplan HotSpots |
| 3rd Floor HotSp1 Pict | Number | HotSpot Picture Number |
| 3rd Floor HotSp2 Pict | Number | HotSpot Picture Number |
| 3rd Floor HotSp3 Pict | Number | HotSpot Picture Number |
| 3rd Floor HotSp4 Pict | Number | HotSpot Picture Number |
| 3rd Floor HotSp5 Pict | Number | HotSpot Picture Number |
| 3rd Floor HotSp6 Pict | Number | HotSpot Picture Number |
| 3rd Floor HotSp7 Pict | Number | HotSpot Picture Number |
| 3rd Floor HotSp8 Pict | Number | HotSpot Picture Number |
| 3rd Floor | OLE Object | Binary Picture Data |
| 3rd Floor Available | Yes/No | Tag for checking if Picture is Available |

METHODS AND SYSTEM FOR DATA ACQUISITION IN A MULTIMEDIA REAL ESTATE DATABASE

TECHNICAL FIELD

The present invention generally relates to methods and systems for data acquisition in a multimedia database, and more specifically, to methods and systems for compiling information about a real estate entity on a computer-readable storage medium using a computer or other like programmable apparatus.

BACKGROUND ART

There are many known methods and systems for providing and utilizing a database of real estate properties. U.S. Pat. No. 5,235,680 to Bijnagte discloses a multimedia database system for maintaining a database containing listings of real estate properties on the market. The system is capable of storing, retrieving, displaying, printing and manipulating color images stored in the database. Further, the system is capable of loading digitized images from remote terminals over telephone lines on an interactive basis. The system includes a multi-user host computer and a plurality of remote data terminals connected to the host computer.

U.S. Pat. No. 5,146,548 to Bijnagte discloses a method and an apparatus for publishing listings of real estate properties. The method includes a step of converting photographed or videotaped images of real estate properties to digital graphics at a front end of a publishing process. Image operations, such as sizing, cropping, and digital quality enhancement are performed when the images are captured.

U.S. Pat. Nos. 5,032,989 and 4,870,576 to Tornetta disclose systems having computer software for creating and maintaining a real estate property database, and for searching the database. Remote seller systems provide property information to a host system. The host system maintains a database of the property information provided thereto. A graphical locator interface allows the database to be searched using search location boundaries.

U.S. Pat. No. 4,429,385 to Cichelli et al. discloses a method of retrieving classified advertising information contained within a broadcast. The classified advertising information, which may include alphanumeric and graphic information, is organized in a sequential database. Selected advertising is retrieved for display using a relational query on the sequential database.

SUMMARY OF THE INVENTION

It is an object of the present invention to provide a database of multimedia information, such as multimedia real estate information, having various types of information, such as images, hot spots, and text, compiled in a single database format.

Another object of the present invention is to provide methods, systems, and articles of manufacture for compiling multimedia information, such as multimedia real estate information, into a single database format.

In carrying out the above objects, the present invention provides a device for storing information about a plurality of houses for access by an application program executed on a computer or other like programmable apparatus. The device comprises a computer-readable storage medium and computer-readable data on the computer-readable storage medium. The computer-readable data is representative of a database containing textual information for each house, at least one exterior image for each house, at least one interior image for each house, and at least one parameter indicating a portion of the exterior image corresponding to the interior image for each house, all in a common database format.

Further in carrying out the above objects, the present invention provides a method of compiling information about a house on a computer-readable storage medium using a computer or other like programmable apparatus having a processor and a memory. The method comprises receiving textual information for the house, receiving an exterior image of the house, receiving an interior image of the house, and receiving at least one parameter indicating a portion of the exterior image corresponding to the interior image. The method further includes compiling the textual information, the at least one exterior image, the at least one interior image, and the at least one parameter into a computer-readable database with a single database format on the computer-readable storage medium.

Still further in carrying out the above objects the present invention provides a system, in accordance with the above-described method, for compiling information about a house on a computer-readable storage medium using a computer or other like programmable apparatus having a processor and a memory.

Yet still further in carrying out the above objects, the present invention provides an article of manufacture used to direct a computer or other like programmable apparatus in accordance with the above-described method to compile information about a house on a computer-readable storage medium.

By compiling the various types of multimedia information into a single database format, embodiments of the present invention are advantageous over the prior art with regard to ease of management and ease of communication of the multimedia information.

These and other features, aspects, embodiments, and advantages of the present invention will become better understood with regard to the following description, appended claims, and accompanying drawings.

BRIEF DESCRIPTION OF THE DRAWINGS

FIGS. 3 is a screen display of a data entry template window for entering textual information;

FIG. 4 is a screen display of the textual information;

FIGS. 11a–11d show the structure of the database in a preferred embodiment of the present invention;

FIG. 19 is a screen display of a window providing a textual and image description of the house;

BEST MODE FOR CARRYING OUT THE INVENTION

Embodiments of the present invention include a data acquisition computer program for compiling information for each of a plurality of houses into a database, and a viewer program for accessing the database. The data acquisition program allows a user to compile pictures, data, and hot spot information in a single database format using a drag-and-drop user interface. In a preferred embodiment of a real estate application, all information about a real estate offering, such as a house, is stored as a single record in the database. This information includes binary picture information, hot spot coordinates and picture identifiers for each hot spot, and textual information to be displayed to the user. Each of the hot spots are created by dragging a rectangle over a portion of the house (such as a window), and then dragging and dropping an image into the rectangle.

The viewer program allows the user to query the database assembled by the data acquisition program. The results of the queried in an event driver, interactive environment.

Figure 1:
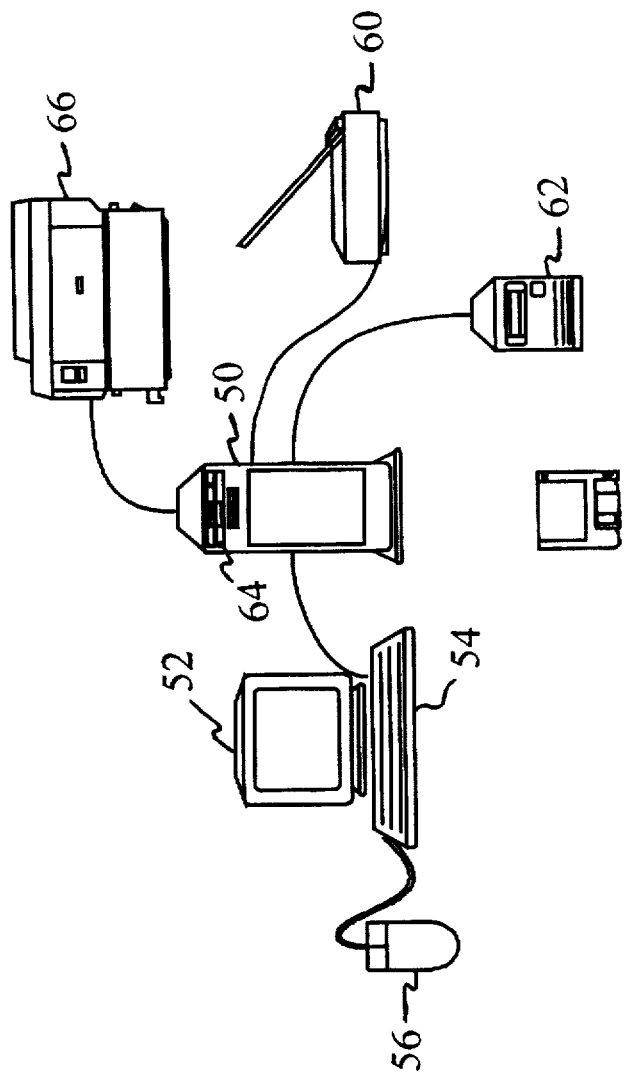
FIG. 1 illustrates a system for compiling information about a house to form a database, and for querying the database.

Turning now to FIG. 1, there is shown a system for compiling information about a house to form a database, and for querying the database. The system includes a computer 50 or other like programmable apparatus having a processor and a memory (not specifically illustrated). For example, the computer 50 may be an IBM compatible PC, a Macintosh compatible PC, a Power PC compatible computer, etc. It should be apparent, though, that other types of computers with different specifications may be employed.

The computer 60 communicates with a display device 52, such as a computer monitor. The computer 50 also communicates with one or more input devices, such as a keyboard 54 and a mouse 56. The mouse 56 is used to click on icons displayed on the display device 52, and to perform click-drag-and-drop operations.

The computer 50 receives image information via either a page scanner 60, a compact disk drive 62, a floppy disk drive 64, or a modem (not specifically illustrated). Other input devices may be used to provide image information to the computer 50, such as a video camera, a digital camera, or a fax. The computer 50 is optionally coupled to a printer 66 to produce hard copy displays of various information contained in the computer 50.

Figure 2:
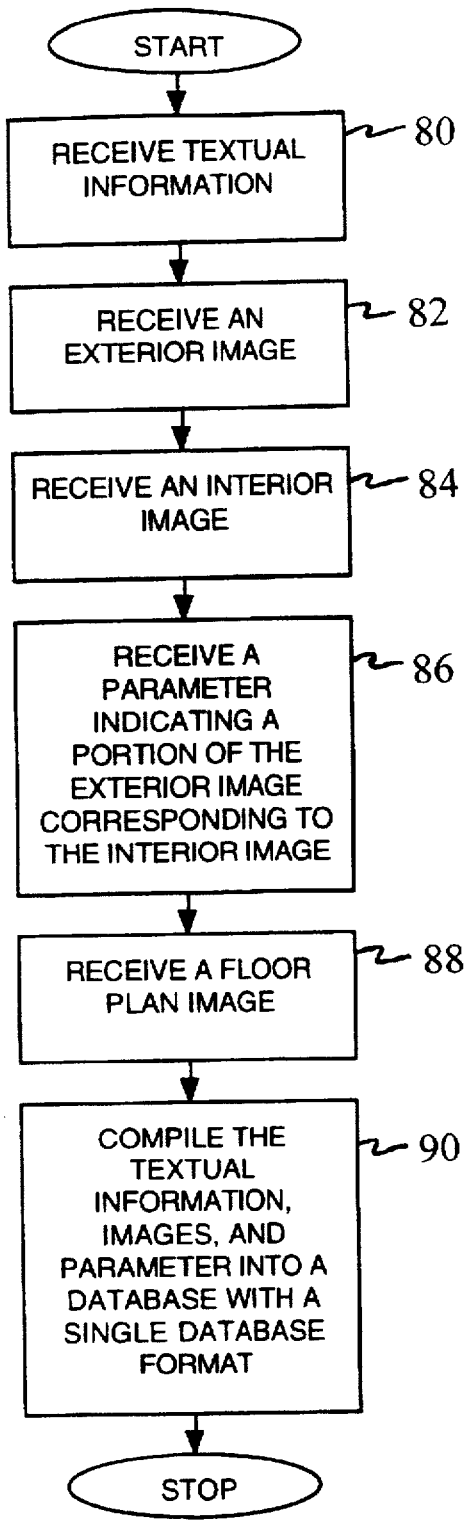
FIG. 2 is a flow chart of a method of compiling information about a house on a computer-readable storage medium.

Turning now to FIG. 2, there is shown a flow chart of a method of compiling information about a house or other real estate offering on a computer-readable storage medium. Examples of the computer-readable storage medium include, but are not limited to, magnetic floppy disks, magnetic tapes, optical disks (such as a CD ROM), a static memory, or a dynamic memory.

As indicated by block 80, the method includes receiving textual information for the house. The textual information may be received by any of the peripherals connected to the computer 50. For example, some of the textual information may be entered using the keyboard 54 and the mouse 56. In a preferred embodiment, receiving textual information for the house is performed by displaying a data entry template on the display device 52. The data entry template contains a plurality of fields, wherein each of the fields corresponds to a different piece of textual information which is to be received. A signal is then received to select one of the fields. The signal may be generated by a point-and-click operation performed by the mouse 56, or a selection operation performed using the keyboard 54, for example. Next, textual data for the selected one of the fields is received. This textual data may be entered using the keyboard 54. Alternatively, the textual information may be entered using an existing textual database, or the page scanner 60 in conjunction with an optical character recognition software program.

The method further includes receiving an exterior image of the house, as indicated by block 82. In a preferred embodiment, a plurality of exterior images of the housing are received. The plurality of exterior images may include, for example, a front exterior view of the house and a rear exterior view of the house.

As indicated by block 84, the method includes receiving an interior image of the house. Preferably, a plurality of interior images of the house are received. The interior images preferably include images of rooms contained within the house.

The interior and exterior images of the house are received by any of the peripherals connected to the computer 50. Specifically, the images may be received from a hard copy representation using the page scanner 60. If the images are in an electronic format, they can be received using the modem. If the images are in a magnetic format, they can be received using the floppy disk drive 64 or a tape drive. Alternatively, if the images are on an optical compact disk, they may be received using the compact disk drive 62. Images can also be formed using a video camera, digital camera, or a fax.

As indicated by block 86, the method further includes receiving at least one parameter indicating a portion of the exterior image corresponding to one of the interior images. The portion of the exterior image is used to define a "hot spot" which may be selected by the user using the viewer program described herein.

If a plurality of interior images are received, then receiving the at least one parameter may be performed in the following manner. Receiving a first signal to select one of the plurality of interior images is performed. The first signal may be generated using either the keyboard 54 or the mouse 56. Next, receiving a second signal to select a portion of the exterior image corresponding to the one of the interior images is performed. The second signal is preferably generated by a click and drag operation performed using the mouse 56. The computer 50 then determines a plurality of coordinates which define the portion of the exterior image based upon the second signal.

Optionally, the method further includes receiving a floor plan image of at least a portion of the house as indicated by block 88. If the house contains a plurality of floors or stories, then a plurality of floor plan images corresponding to each floor can be received. Hot spots may also be defined for regions of the floor plan image. Here, an interior image can be assigned to a portion of the floor plan image corresponding to a room in the house.

As indicated by block 90, the method includes compiling the textual information, at least one exterior image, at least one interior image, and the at least one parameter into a computer-readable database on the computer-readable storage medium. The computer-readable database contains all of this information using a single database format. Preferably, all of the information about a house is stored as a single record in the database. Here, the information may be stored in a single relational record in a relational database. Any of a number of different databases may be utilized, such as the Microsoft Access database or the Microsoft SQL server database. In an exemplary embodiment of the present invention described hereinafter, all of the information about the house is stored in a single file on the computer-readable storage medium. This single file includes binary image information, coordinates and picture identifiers for each hot spot, and textual information about the house.

It is noted that in a preferred embodiment, the binary image information is a compressed version of the original image received. This aids in reducing the amount of storage space required to store the database information on the computer-readable storage medium.

Based upon the above-described embodiments of the computer-implemented process of the present invention, a related article of manufacture may be produced to direct the computer 50 or other like programmable apparatus to compile information about a house on a first computer-readable storage medium. The article of manufacture comprises a second computer-readable storage medium, such as a memory device, a compact disk, a floppy disk, a tape, or the like. The article of manufacture further comprises a computer program represented as computer-readable data on the second computer-readable storage medium. The computer program directs the computer 50 to perform in accordance with embodiments of the present invention.

Figure 3:
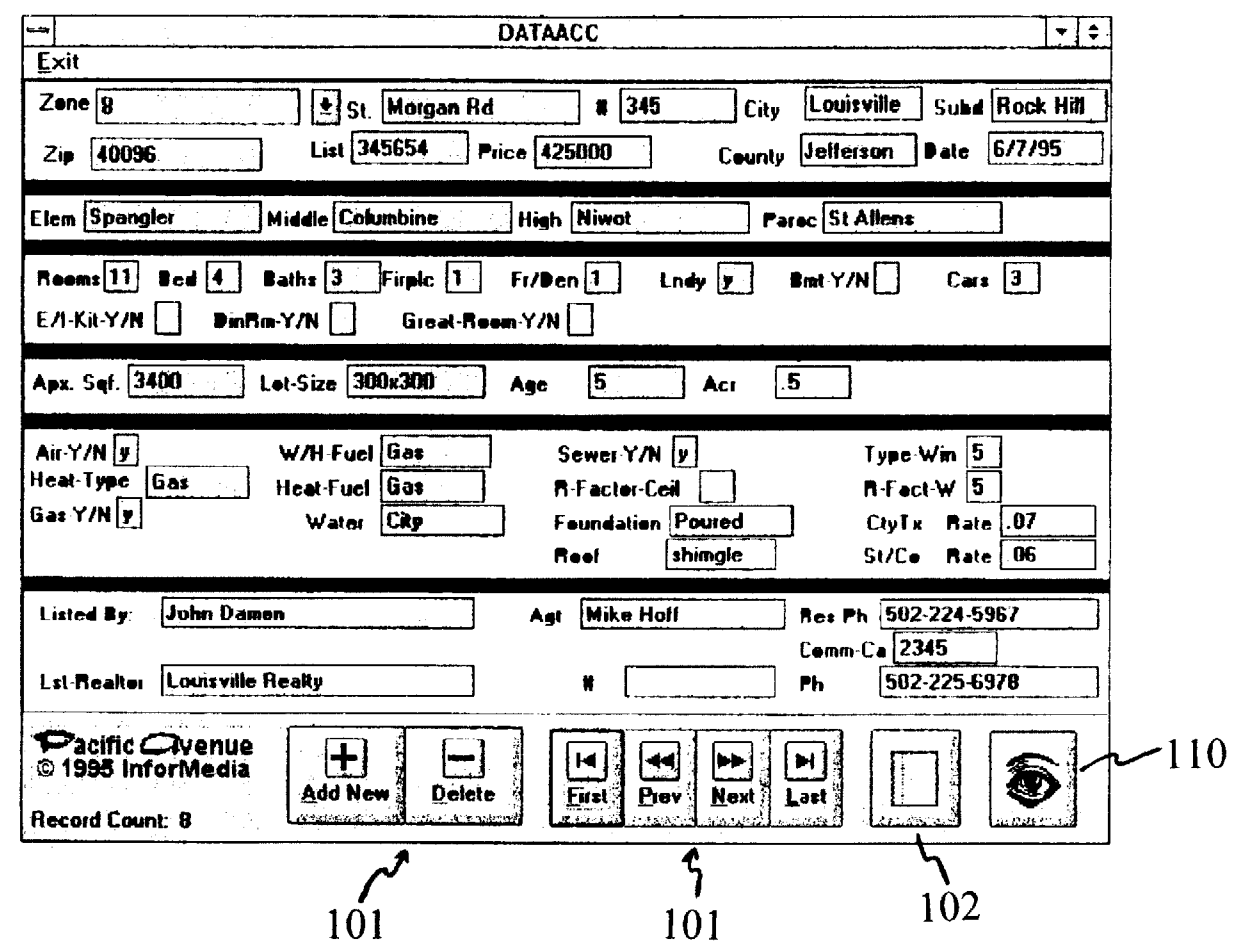

FIGS. 3–10 illustrate various screen displays, displayed on the display device 52, in preferred embodiments of a method and system for compiling information about a house on a computer-readable storage medium. FIG. 3 is a screen display of a data entry template window for entering textual information for reception by the computer 50. The data entry template contains a plurality of fields for entering a variety of different textual data. The textual information includes a geographical zone indicator, a street name, a street address number, the name of the city, the name of the subdivision, the zip code, the list price of the house, a second price of the house, the county in which the house is located, and a date of entry. The textual information may further include information about the school district which serves residents of the house, such as the elementary school, the middle school, the high school, and the parochial school. The textual information may further include specifications of the house, such as the number of rooms in the house, the number of bedrooms, the number of bathrooms, the number of fireplaces, the number of family rooms or dens, the availability of a laundry room, the availability of a basement, the size of the garage, the availability of a kitchen, a dining room, and a great room. Other specifications include an approximate square footage of the house, the lot size, and the age of the house. Further specifications may include the availability of air conditioning, the type of fuel used for heating, the availability of gas, the source of water, the availability of sewers, the insulation efficiency of the ceiling and windows, the type of foundation, the type of roof, the city tax rate, and the state and county tax rate. Also included is agent information, such as the name of the real estate agent, the name of the realtor, and phone numbers.

Figure 4:
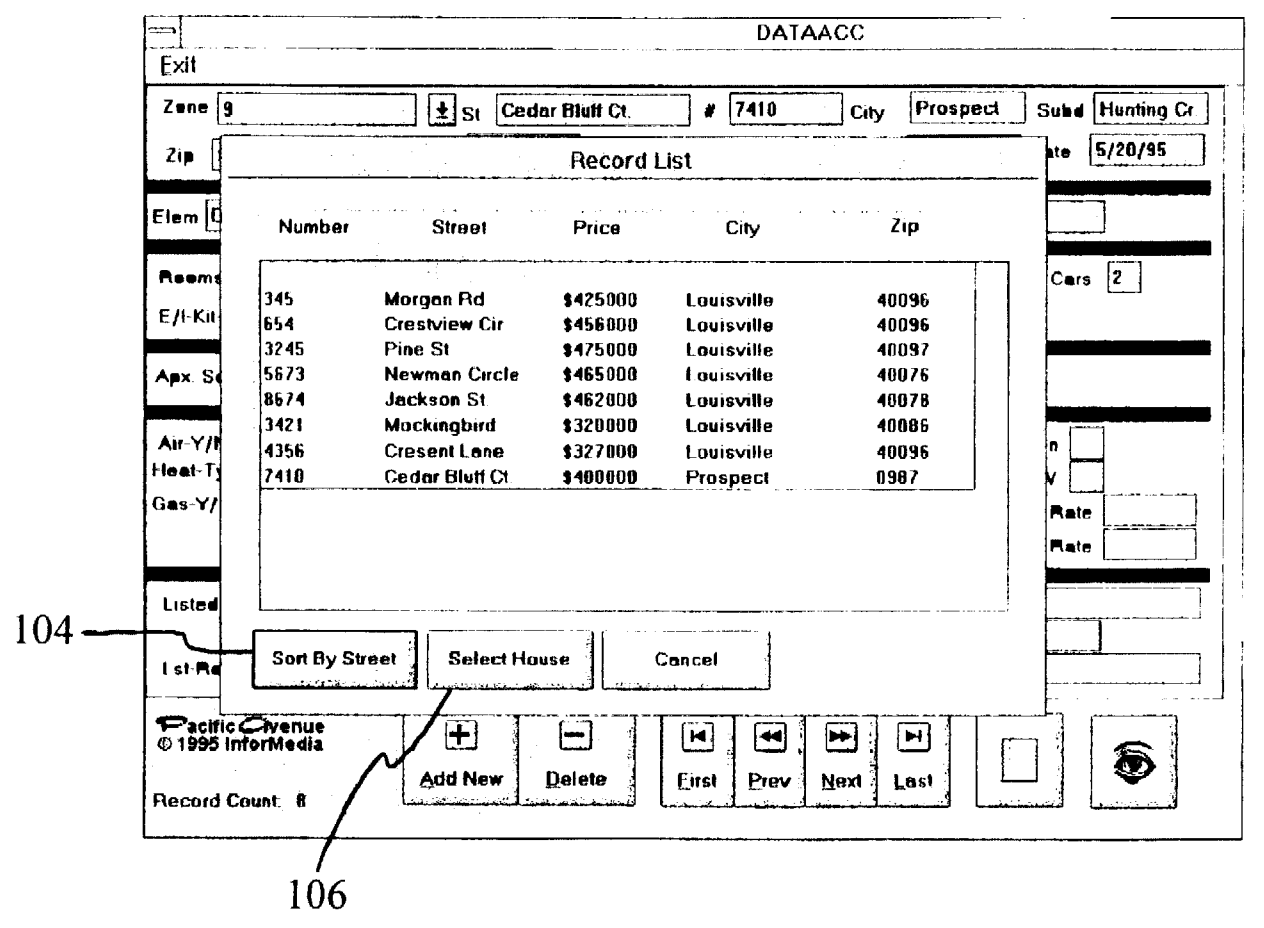

On the lower part of the screen display, there are located a number of icon buttons 101 to control the addition and deletion of new records into the database, and to select which record is to be displayed for either viewing or editing. Another icon button 102 can be selected to provide a list of the house records contained in the database, an example of which is shown in FIG. 4. The list may be sorted by street by selecting an icon button 104. The displayed list may be reviewed by a user to find a particular house of interest for selection using the "Select House" icon button 106.

Figure 5:
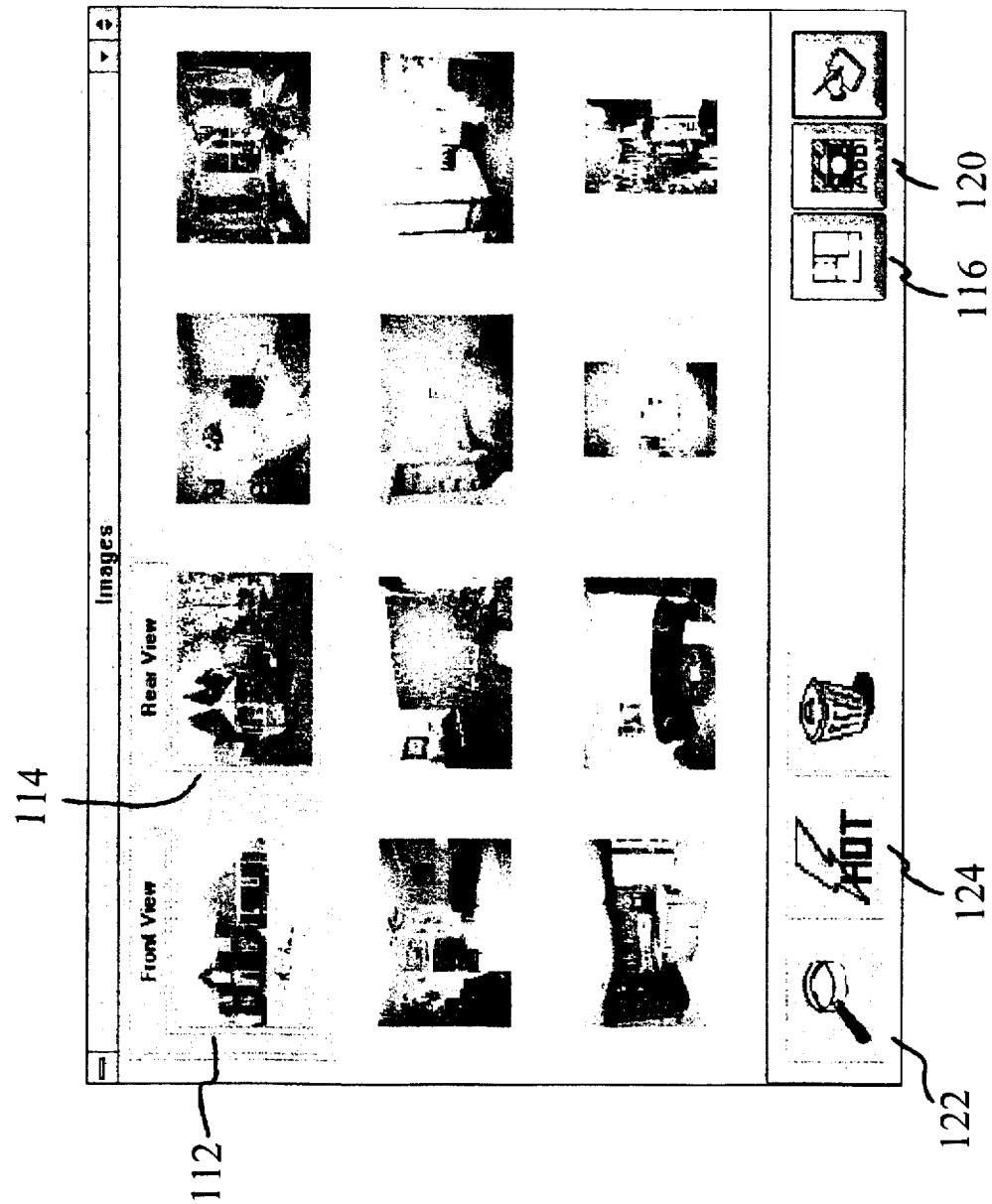
FIG. 5 is a screen display of a picture carousel of interior and exterior images of a house.
Figure 6:
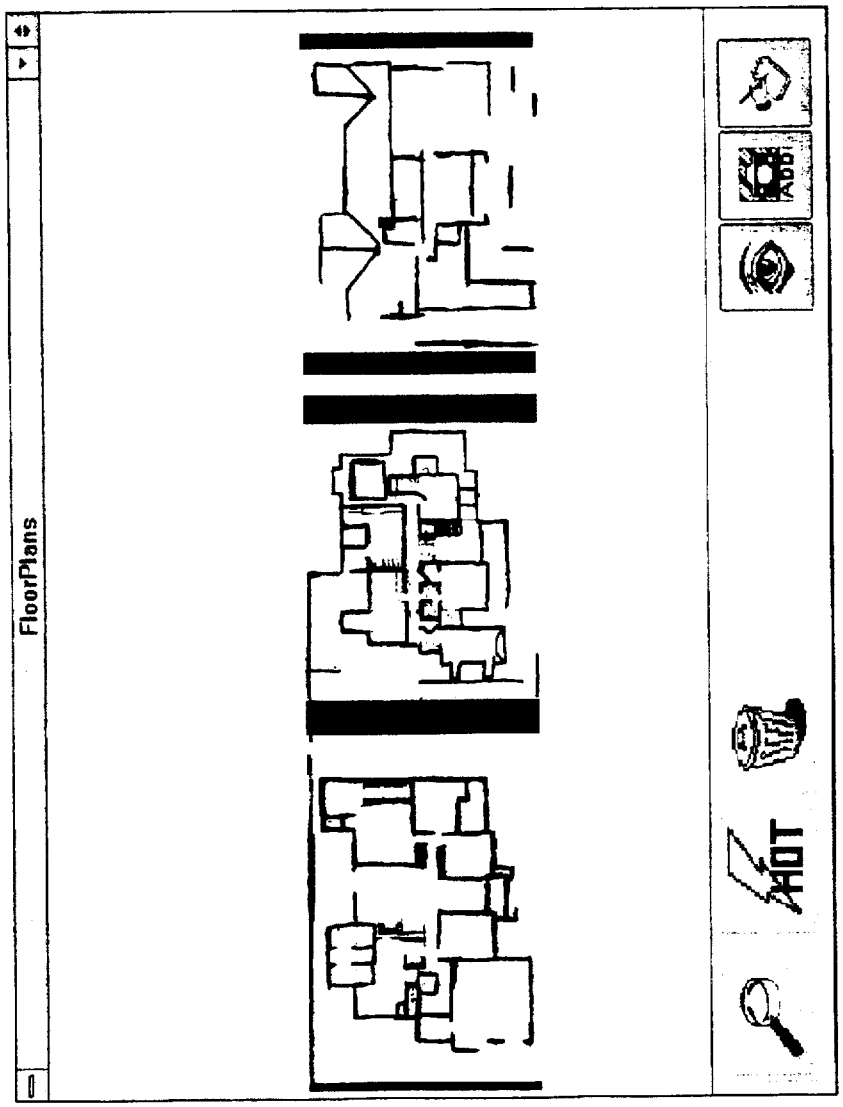
FIG. 6 is a screen display of floor plan images of a house.

Turning back to FIG. 3, the screen display includes an icon button 110 which is selected to provide a screen display of the interior and exterior images of the house currently in the database. An example of such a picture carousel of images is illustrated in FIG. 5. In this example, the images include two exterior images, namely, a front view image 112 and a rear view image 114. The images also include ten interior images of various rooms within the house. By selecting the icon button 116, the floor plan images for the house are displayed. An example of such a screen display of floor plan images of a house is given in FIG. 6.

Figure 7:
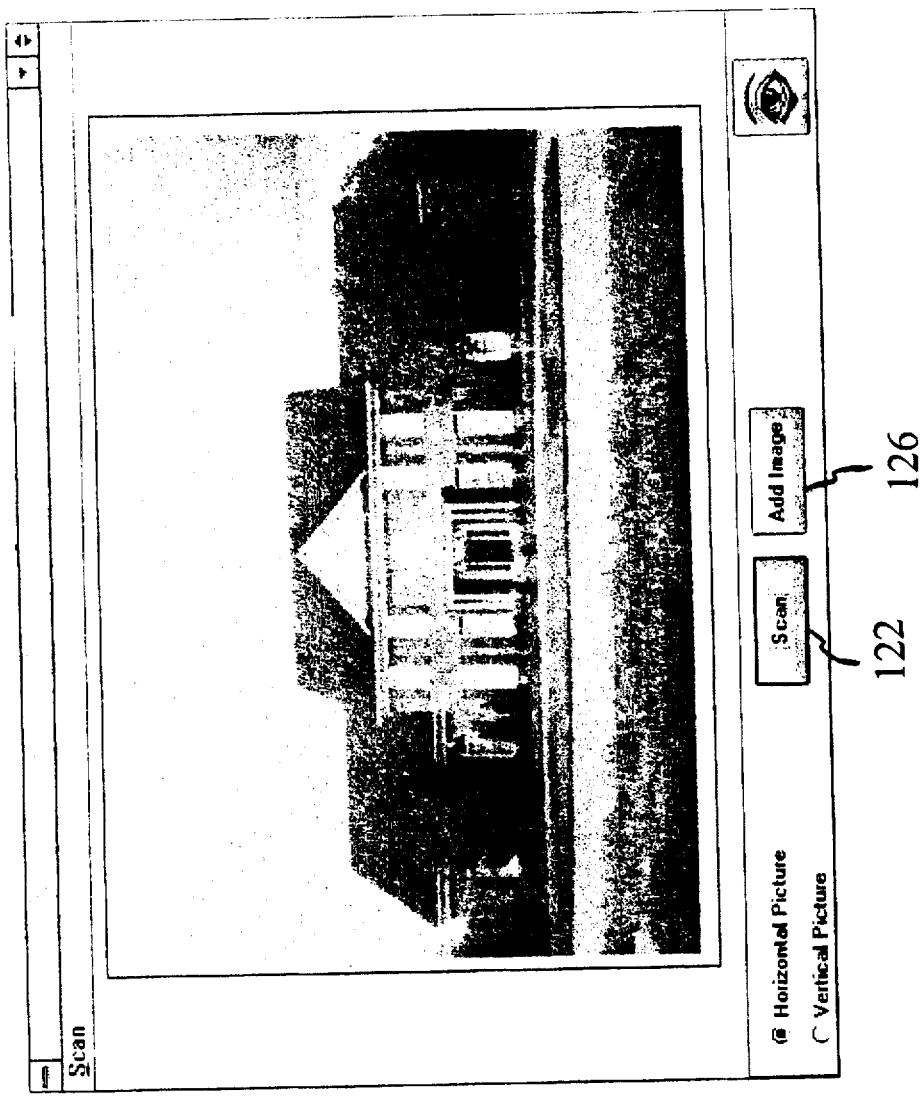
FIG. 7 is a screen display of an image received by the system.

Referring back to FIG. 5, an image is received by selecting the "Add" icon button 120. In response to selecting the icon button 120, a window shown in FIG. 7 is displayed on the display device. The image is scanned in using the page scanner after selecting the "Scan" icon button 122. The scanned image 124 is displayed in the window. If the user wants to add the scanned image 124 to the database, the "Add Image" icon button 126 is selected.

Figure 8:
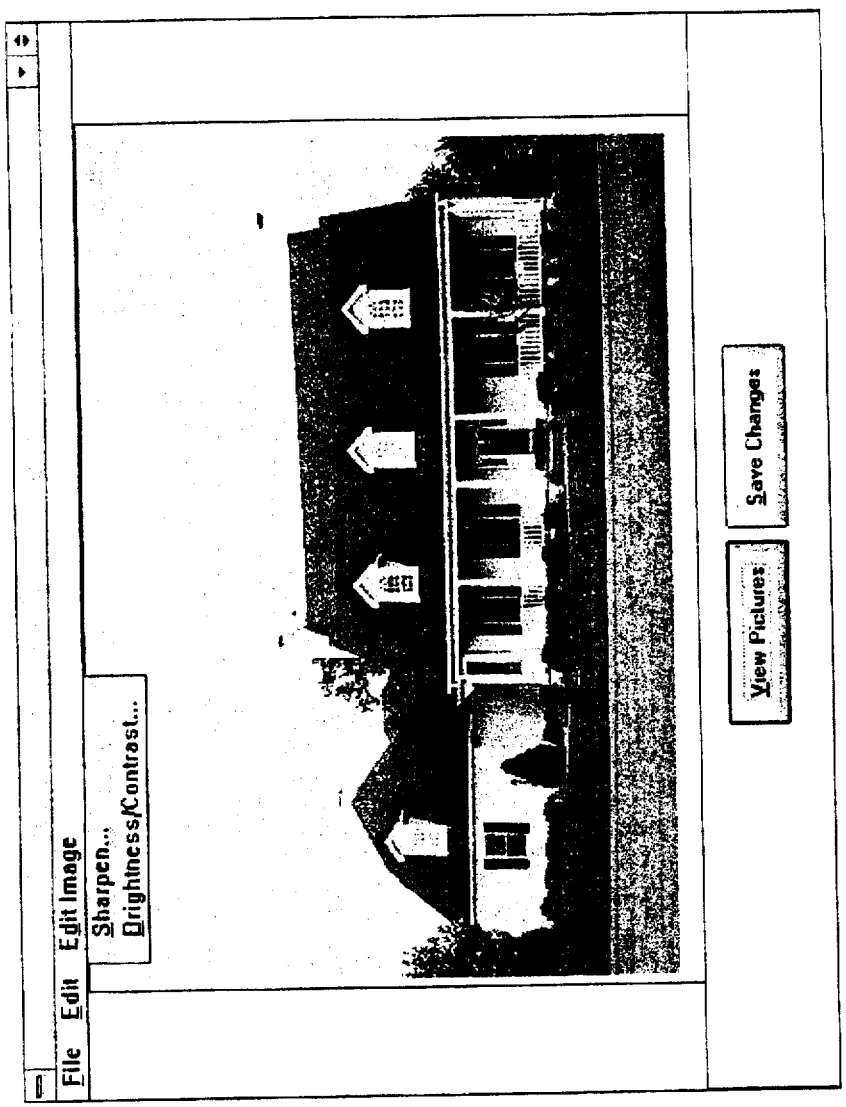
FIG. 8 is a screen display illustrating editing of the image.

Scanned images may be edited by the user using a display window as shown in FIG. 8. Using this window, various types of image processing may be performed on the scanned image. For example, the scanned image may be sharpened, or the brightness and contrast of the image may be modified. Further, a portion of the scanned image may be zoomed upon. The zooming and editing functions are selected by the user using the icon button 122 in FIG. 5.

In a preferred embodiment, autosizing the scanned image before adding the image to the database is performed. This is useful when hard copy pictures of various sizes are scanned using the page scanner. Further, converting the image to a single resolution standard is preferably performed. This is beneficial in providing a uniform representation of digital images of various resolutions.

Figure 9:
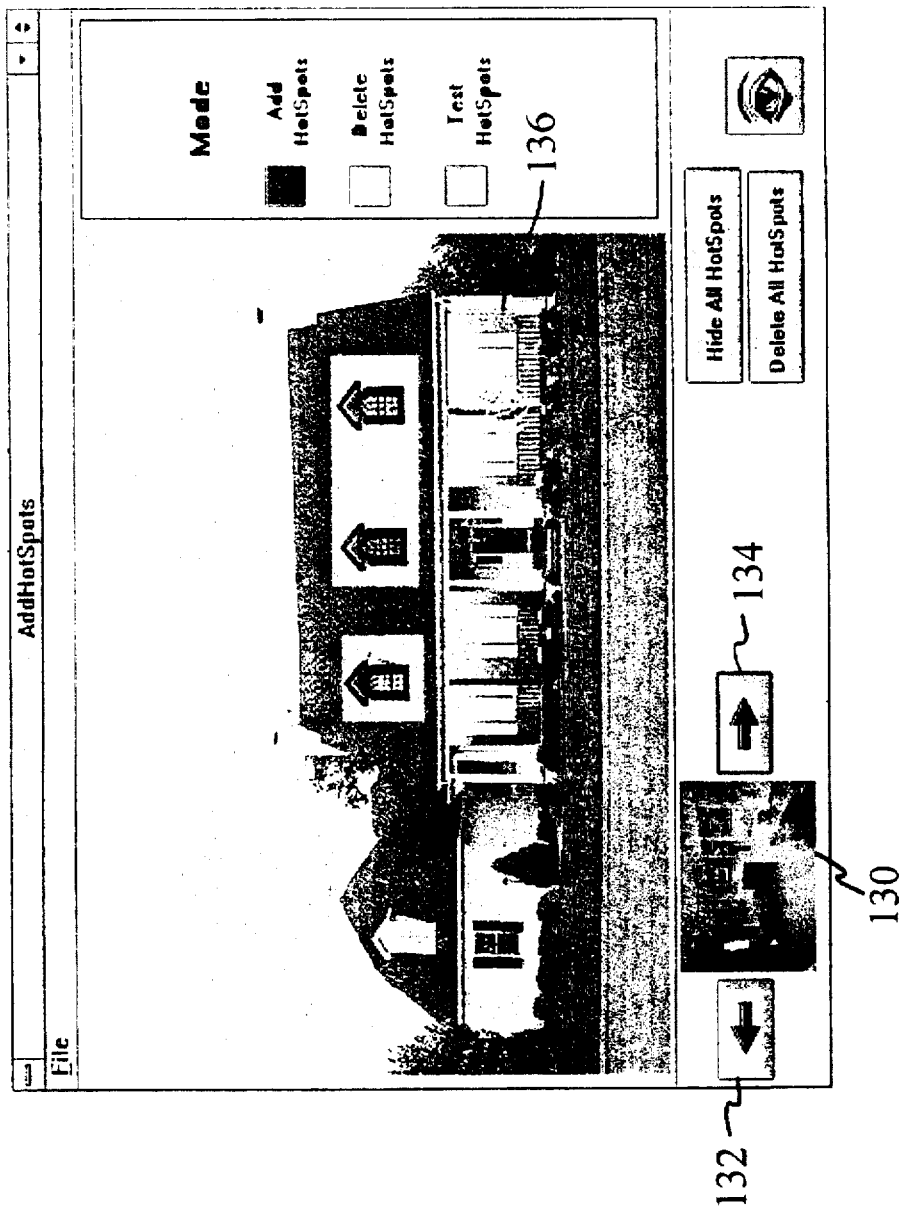
FIG. 9 is a screen display of a window for adding hot spots.

Still referring to FIG. 5, a hot spot, which indicates a portion of an exterior image corresponding to one of the interior images, may be added by selecting the icon button 124. In response to selecting this icon button, a screen display for adding hot spots, such as the one shown in FIG. 9, is displayed. The user creates a hot spot by selecting one of the interior images 130 using icons 132 and 134, and clicking and dragging a rectangle over a portion of the exterior image. The user then drags and drops the selected interior image into the rectangle. In a preferred embodiment, the portion of the exterior image is rectangular in shape and includes a window of the house. Here, the interior image is an interior view of a room of the house behind the window. The screen display in FIG. 9 further provides icon buttons for adding hot spots, deleting hot spots, and testing hot spots.

Figure 10:
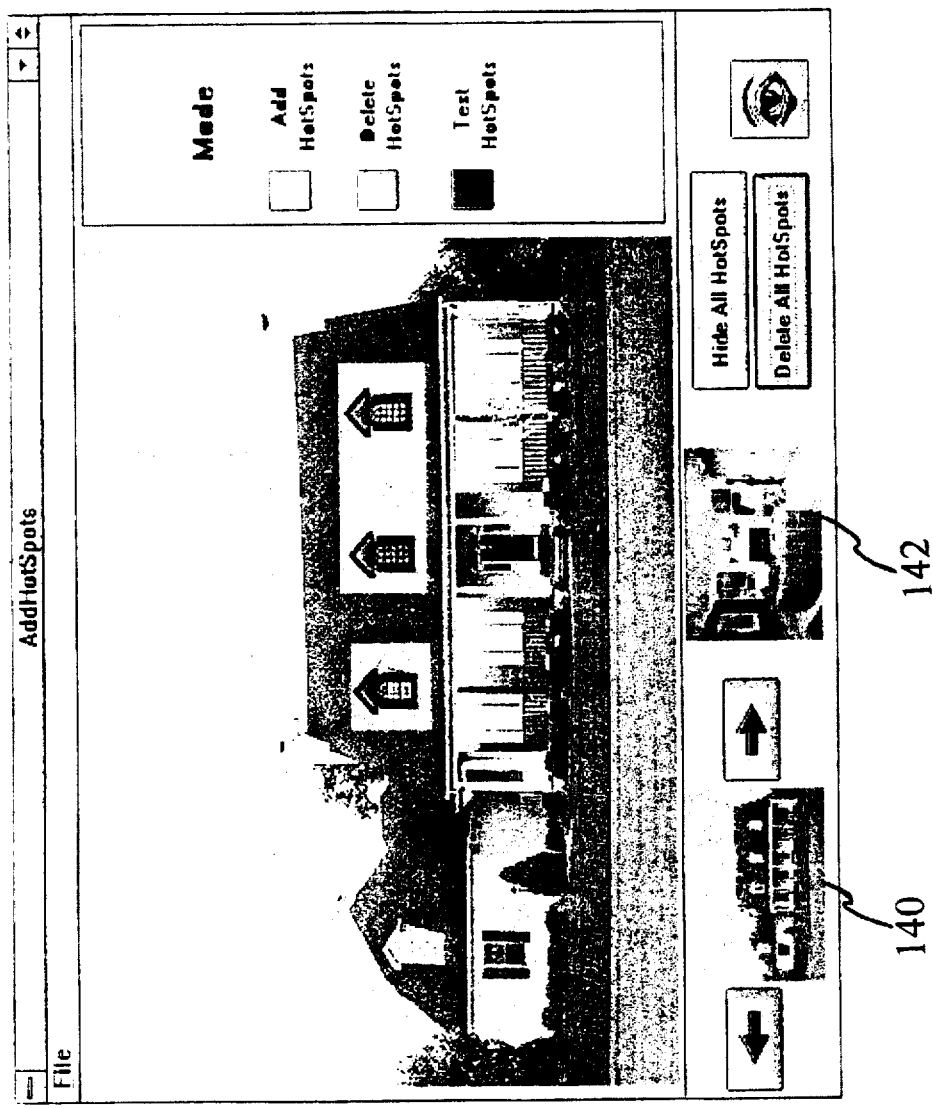
FIG. 10 is a screen display of a window for testing the hot spots.

FIG. 10 is a screen display illustrating testing hot spots. This screen display provides a display of the exterior image 140 and the interior image 142 having a hot spot corresponding thereto.

By using the above-described data acquisition program, a variety of information can be entered for a number of houses. This information is compiled into a single database format to form a computer-readable database on a computer-readable storage medium. As a result, a device for storing information for access by an application program executed on a computer or other like programmable apparatus results by use of embodiments of the present invention.

FIGS. 11a–11d show the structure of a database record for a single home containing textual information, exterior images, interior images, and hot spot information in a preferred embodiment of the present invention. Specifically, the name of each data field, along with its data type, and a description are shown. It is noted that alternative embodiments of the present invention may contain any subset of the data fields illustrated in FIGS. 11a–11d.

In a preferred embodiment of the present invention, four corner points are stored in the database, along with the appropriate house, when a hot spot is created. When a picture is dragged and dropped into a hot spot, the appropriate information associating it with a particular hot spot is also stored in the database. Further in a preferred embodiment, a thumbnail representation of each image is stored in the database. The thumbnail representation has a reduced resolution, and is utilized in the viewer program described hereinafter.

An embodiment of a viewer program which allows a user to query the database assembled by the data acquisition program is now described. The viewer program allows the user to view the results of a query in an event driver, interactive environment. The viewer program reads the appropriate information from the database to assemble hot spots, images, and data, for a point and click playback. As a result, the viewer program provides the ability to click on hot spots, such as windows, to view the rooms behind the windows. The viewer program further provides the ability to click on rooms in a floor plan to view actual pictures of the rooms.

Figure 12:
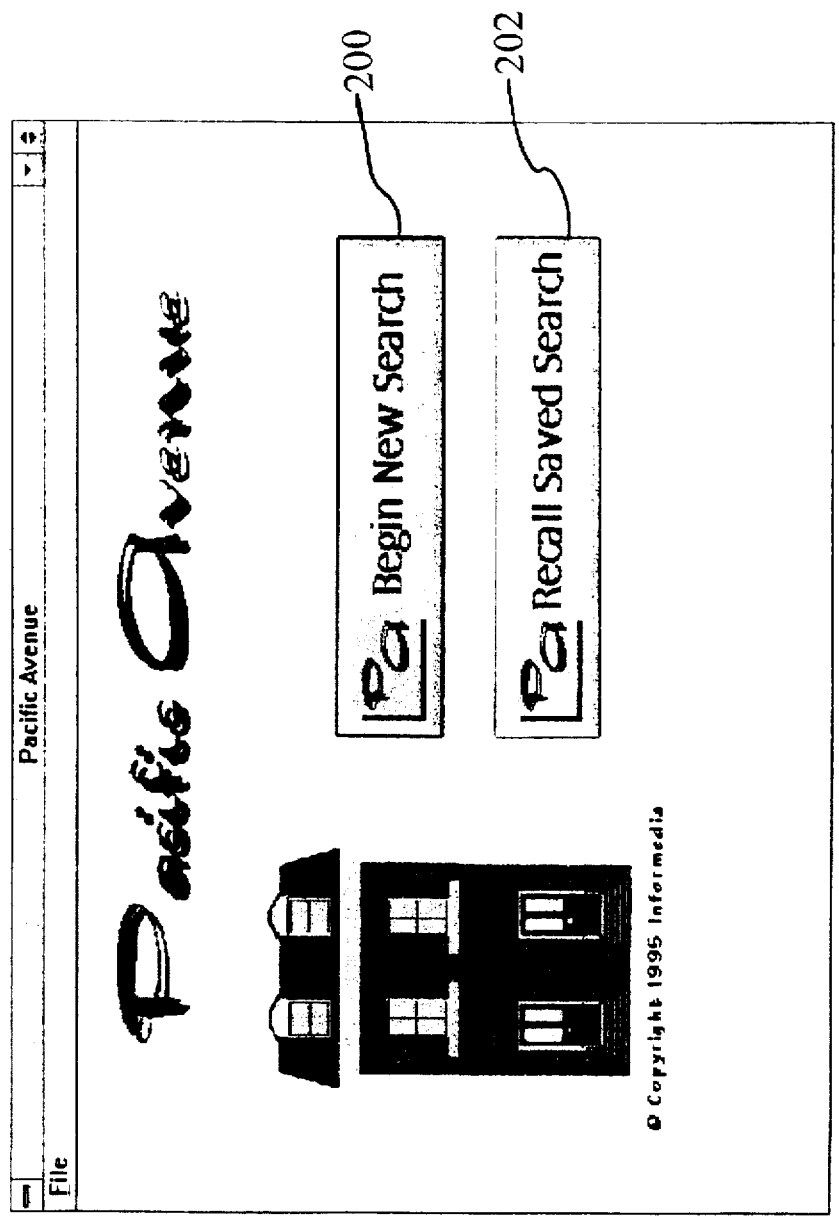
FIG. 12 is a screen display of a menu window used to query the database.

FIG. 12 illustrates a screen display of a menu window used to query the database in the viewer program. The screen display provides an icon 200 which can be selected by the user to begin a new search. The screen display also provides an icon 202 which can be selected by the user to recall a saved search.

Figure 13:
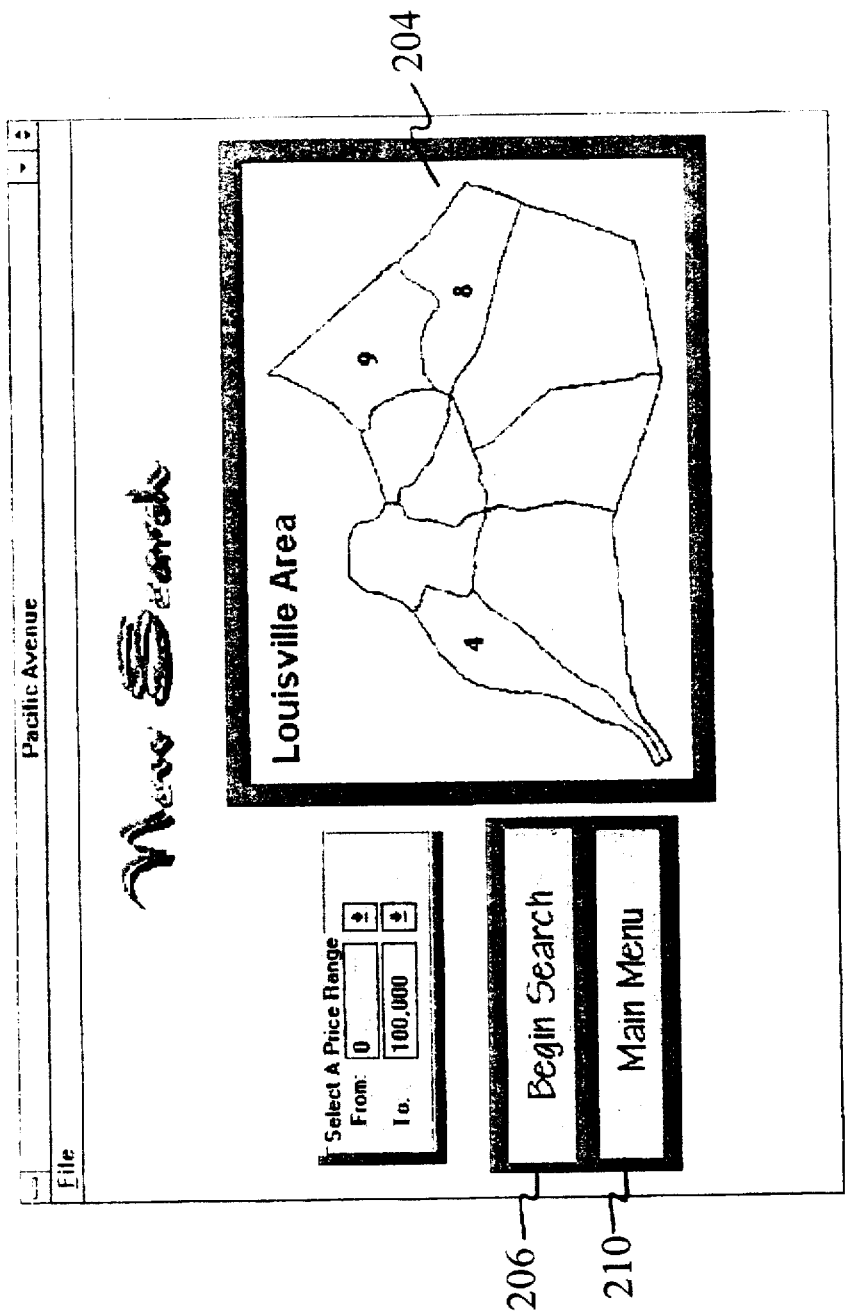
FIG. 13 is a screen display of a new search window.

FIG. 13 is a screen display which is presented to the user upon his or her selection of the begin-new-search icon 200. The screen display provides a display of a geographical region 204 which is partitioned into a number of subregions. Using the mouse, the user is provided the capability of selecting one or more of the subregions within which the search is to be performed. The screen display further allows the user to select a price range of houses which are to be searched. The search is then commenced by selecting the begin-search icon button 206. If the user wishes to return to the main menu, the icon button 210 may be selected. It is noted, however, that the database can be queried on any combination of fields contained therein, and is not limited to price and geographical location.

Figure 14:
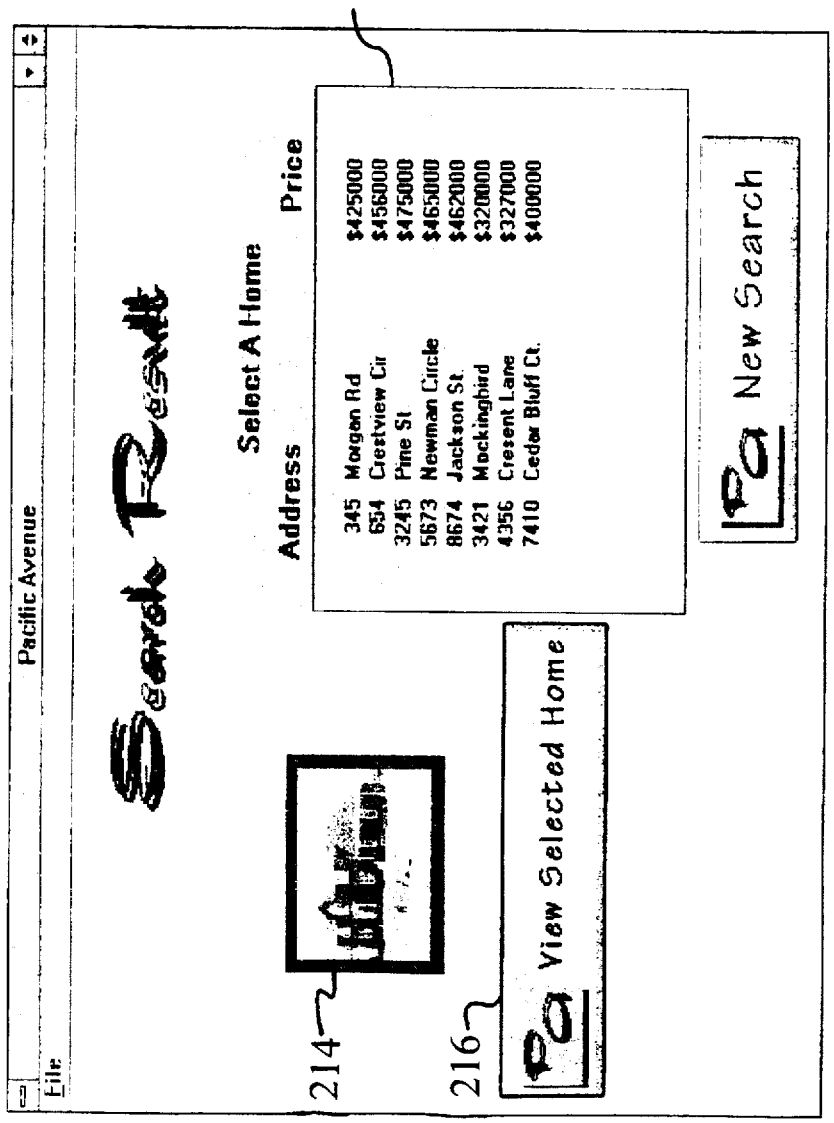
FIG. 14 is a screen display of results of a search.

After selecting the begin-search icon button 206, the records stored in the database are searched to find the set of houses located within the selected subregions and having the desired price range. FIG. 14 illustrates a screen display which provides the results of the search to the user. In particular, the screen display provides a list 212 of the houses located in the search, and a thumbnail image 214 of a selected one of the homes in the list 212. Information regarding the selected home may be viewed by the user by selecting the view-selected-home icon button 216 on the screen display.

Figure 15:
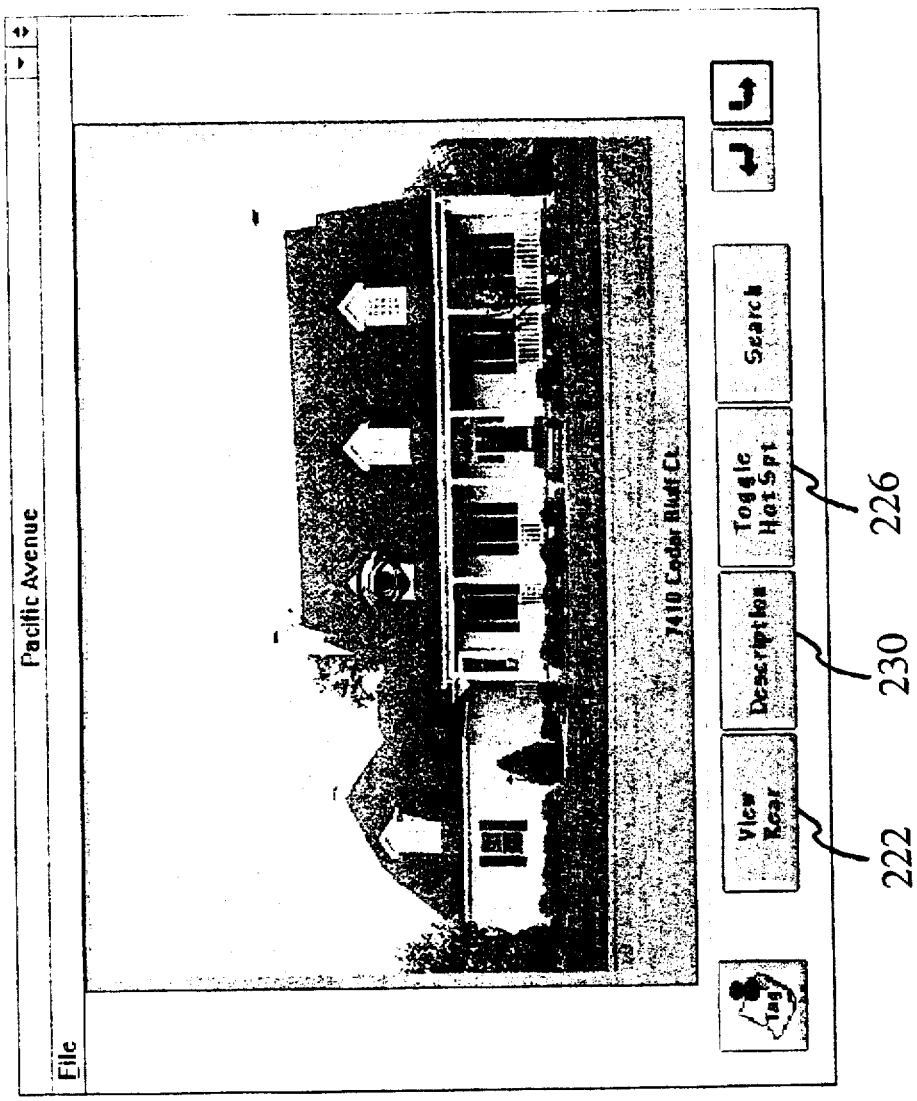
FIG. 15 is a screen display of a window illustrating an exterior image of a house selected in a new search.
Figure 16:
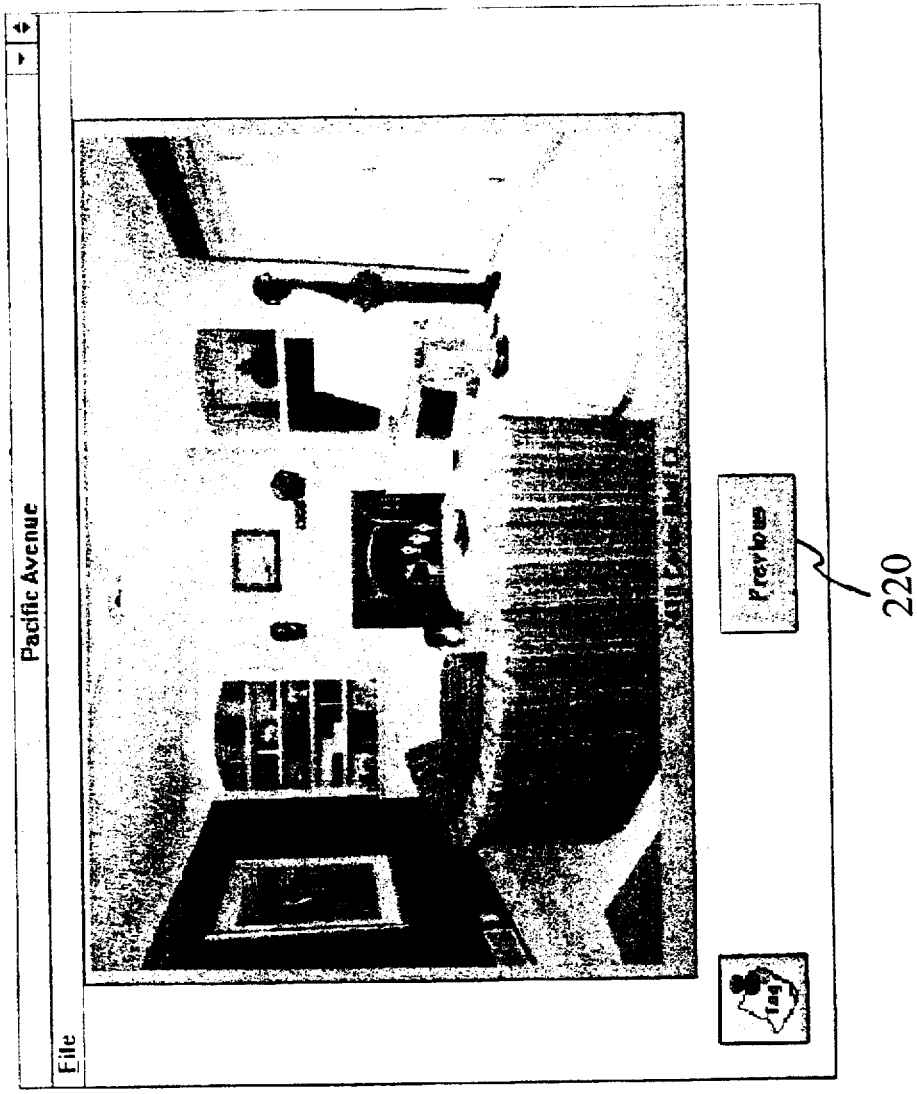
FIG. 16 is a screen display of an interior image of the house as a result of selecting a hot spot.

Upon selecting the view-selected-home icon 216, a screen display showing an exterior image of the selected house is shown, such as the one in FIG. 15. The user can utilize the mouse to move the location of a cursor throughout the exterior image of the house. If the cursor is located on a hot spot, the representation of the cursor is changed from a standard representation to a second representation to indicate the hot spot. In a preferred embodiment, the cursor appears as an arrow when not on a hot spot, and appears as an eye when located on a hot spot. As illustrated in FIG. 15, the cursor appears as an eye when located over one of the upstairs windows. The user can then click the mouse on the hot spot to provide an image of an interior view of the house, specifically of the room located behind the window. FIG. 16 shows a screen display illustrating an interior image of the house as a result of the user clicking on the hot spot. The user can return to the exterior image of the house by selecting the previous icon button 220.

Figure 17:
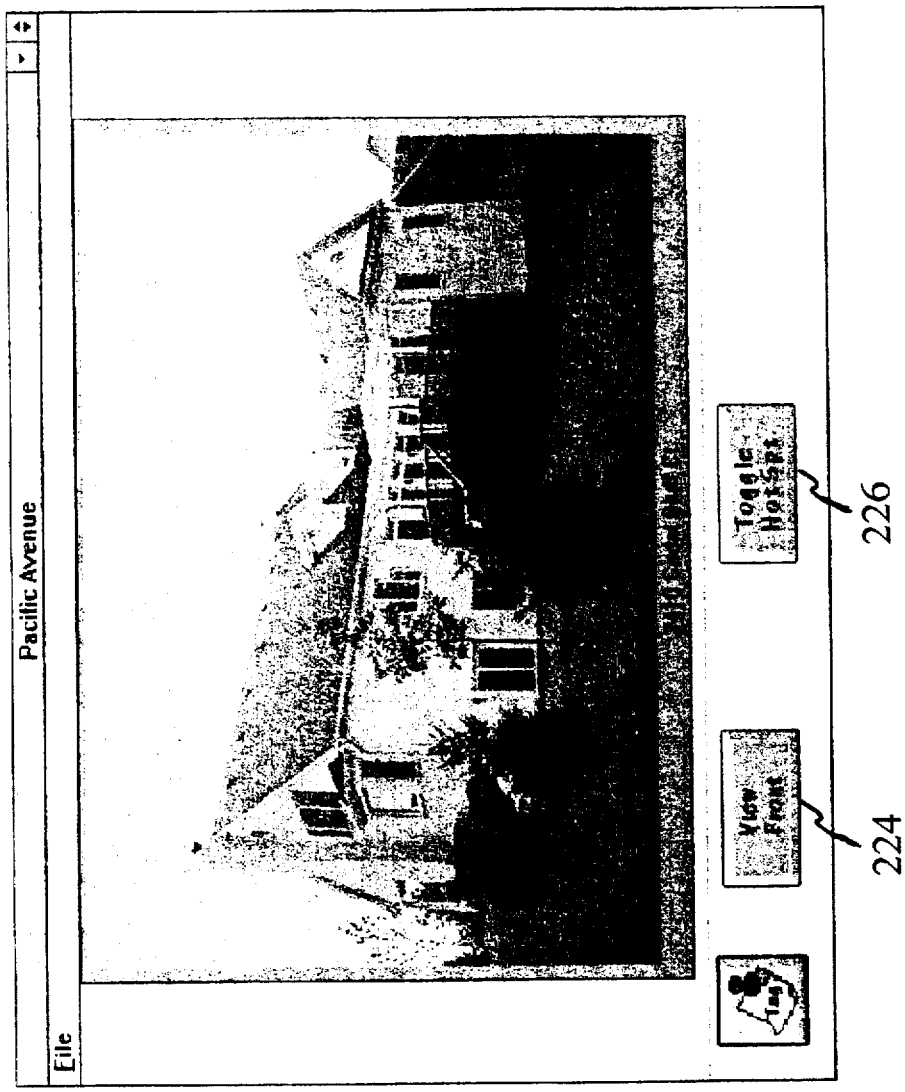
FIG. 17 is a screen display of a window illustrating a second exterior image of the house.

Referring back to FIG. 15, a second exterior image of the house can be displayed by selecting the view-rear icon button 222. FIG. 17 illustrates a screen display showing the second exterior image of the house as a result of selecting the icon 222. This rear exterior image of the house may also have hot spots associated therewith. To return to the screen display of FIG. 15, the user selects the view-front icon button 224.

Figure 18:
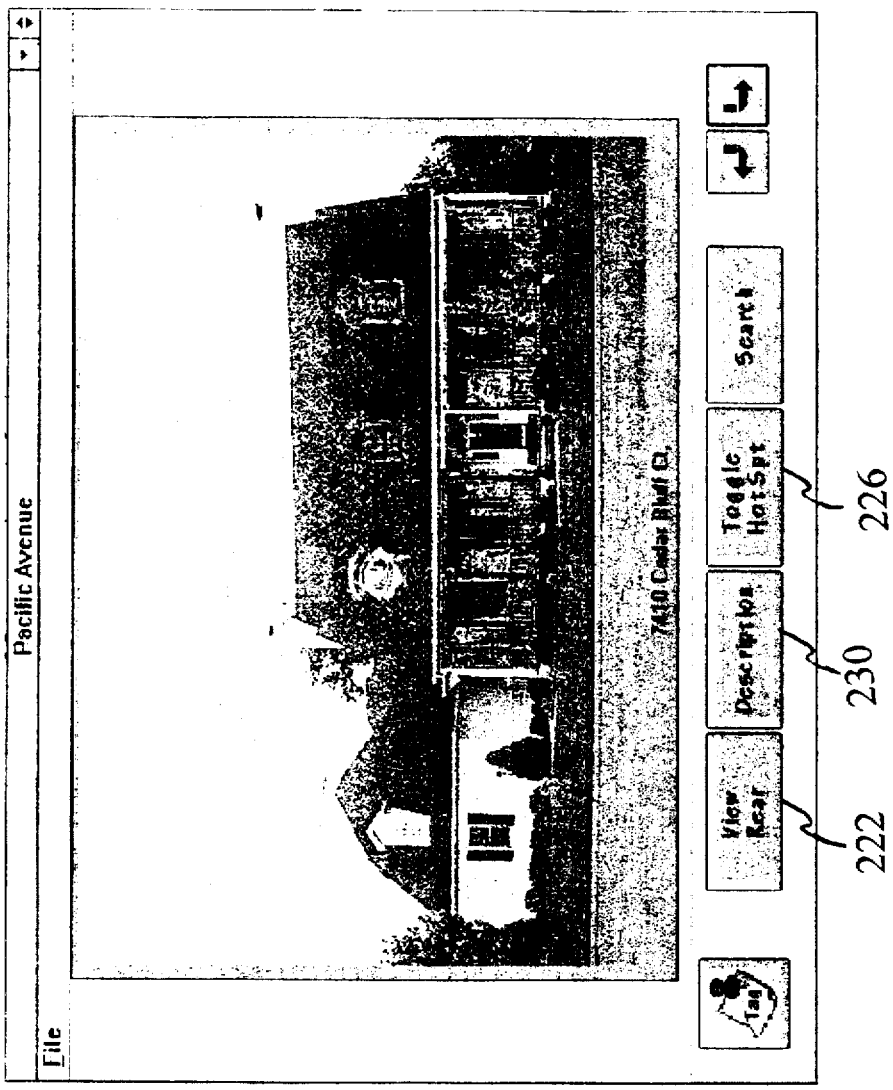
FIG. 18 is a screen display illustrating a toggling of the hot spots.

Turning back to FIG. 15, the viewer program highlights all of the hot spot locations corresponding to the exterior view if the toggle-hot-spot icon button 226 is selected by the user. FIG. 18 illustrates the highlighted hot spots for the front, exterior image of the house. By displaying all of the hot spots, the user can easily determine their locations.

Figure 19:
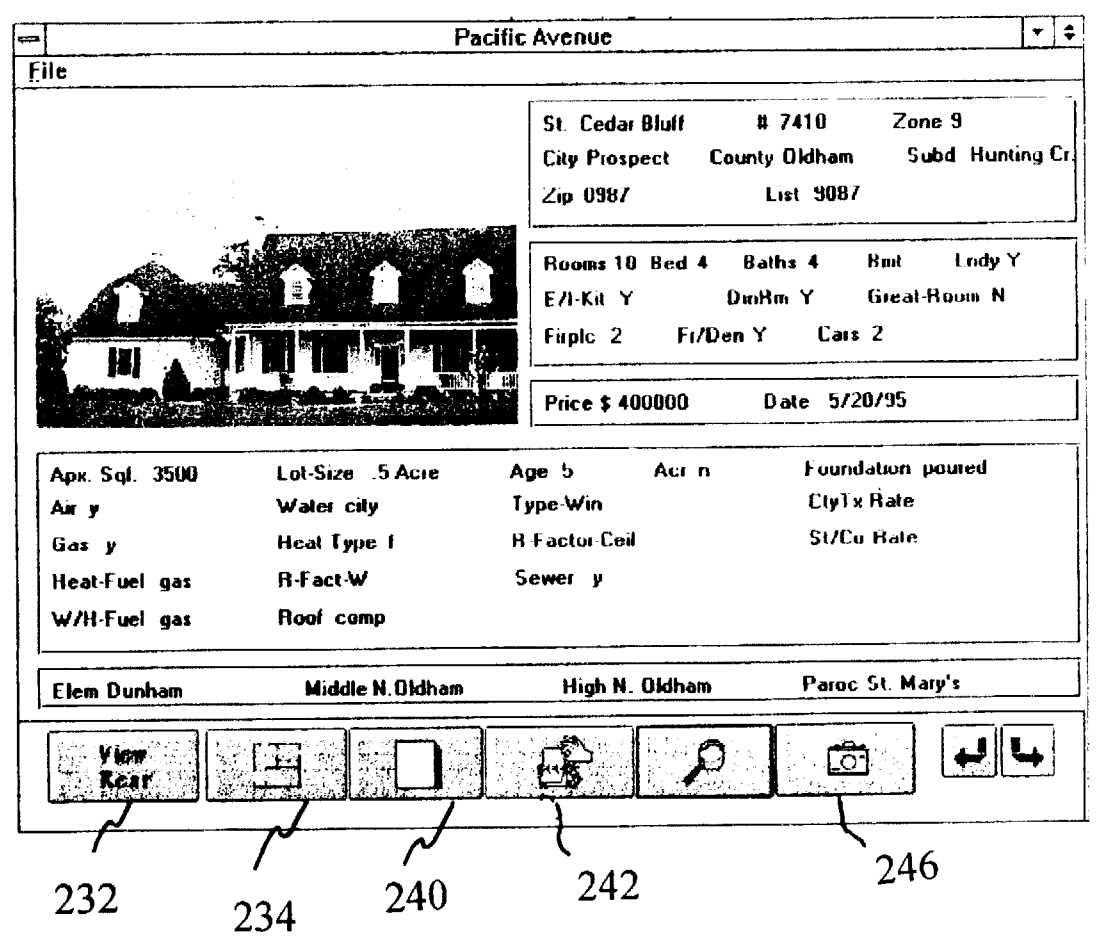
Figure 20:
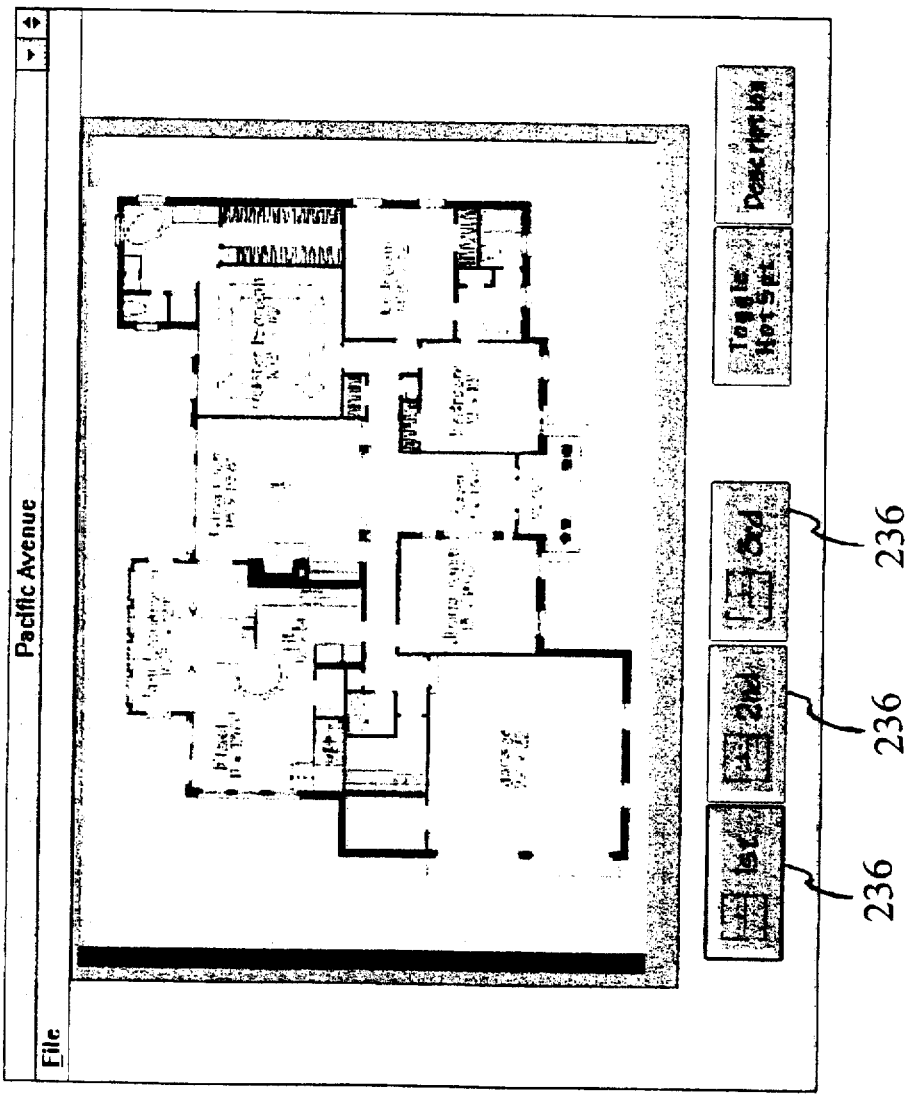
FIG. 20 is a screen display of a selected floor plan image for the house.

A textual description of the house is displayed when the description icon button 230 is selected. FIG. 19 shows an example of a screen display which is provided when the user selects the description icon 230. This screen display includes an exterior image of the house, along with textual information stored in the database. On the lower part of the screen display, there are located a number of icons to provide further descriptive information stored in the database. A view-rear icon button 232 may be selected by the user to display a rear exterior view of the house. Another icon button 234 is used for selecting the display of a floor plan associated with the house. FIG. 20 shows a screen display of a selected floor plan image for the house which is displayed upon selecting the icon 234. This screen display provides icons 236 for selecting one of a number of floor plan images to be displayed on the screen display.

Figure 21:
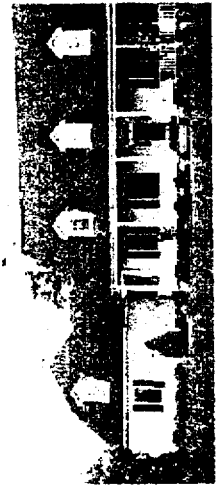
FIG. 21 is a screen display of realtor information for the house.
Figure 22:
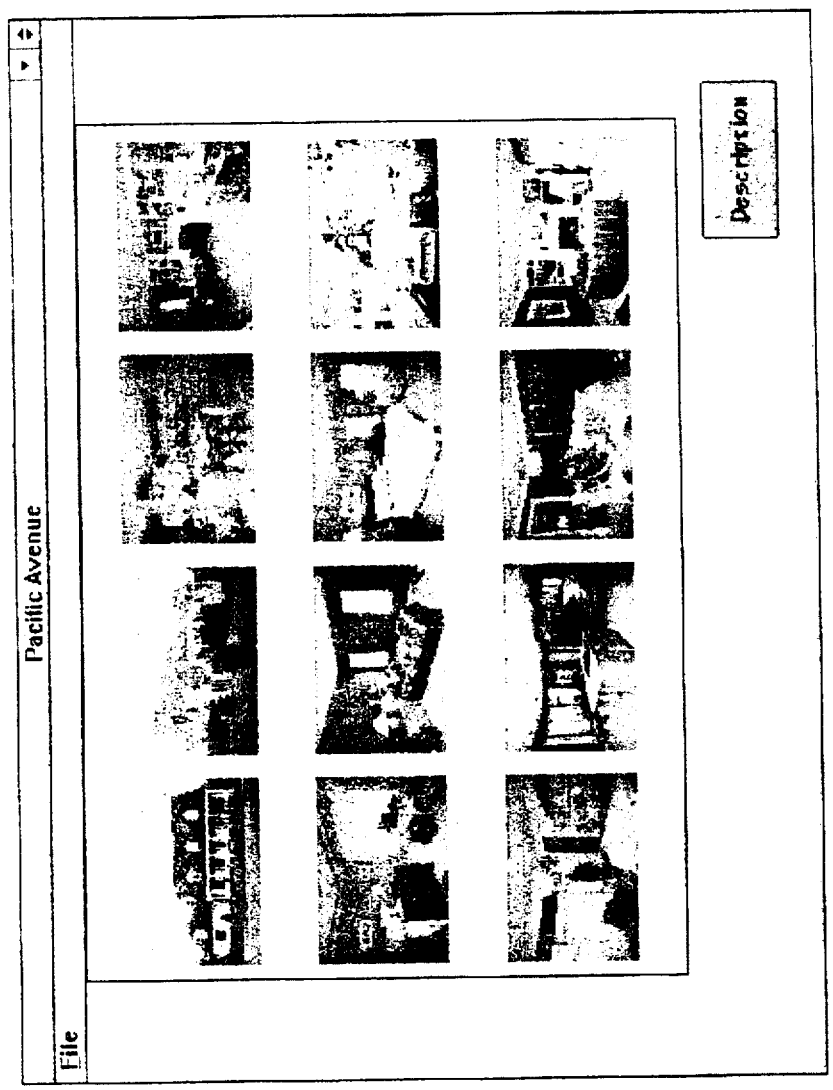
FIG. 22 is a screen display of a picture carousel of the interior and exterior images of the house.

Turning back to FIG. 19, an icon button 240 can be selected by the user to return to the new search screen display of FIG. 14. Another icon button 242 may be selected to provide realtor information as illustrated by the screen display in FIG. 21. By selecting an icon button 246, a screen display comprising the interior and exterior images of the house is displayed. An example of such a screen display is illustrated in FIG. 22.

Figure 23:
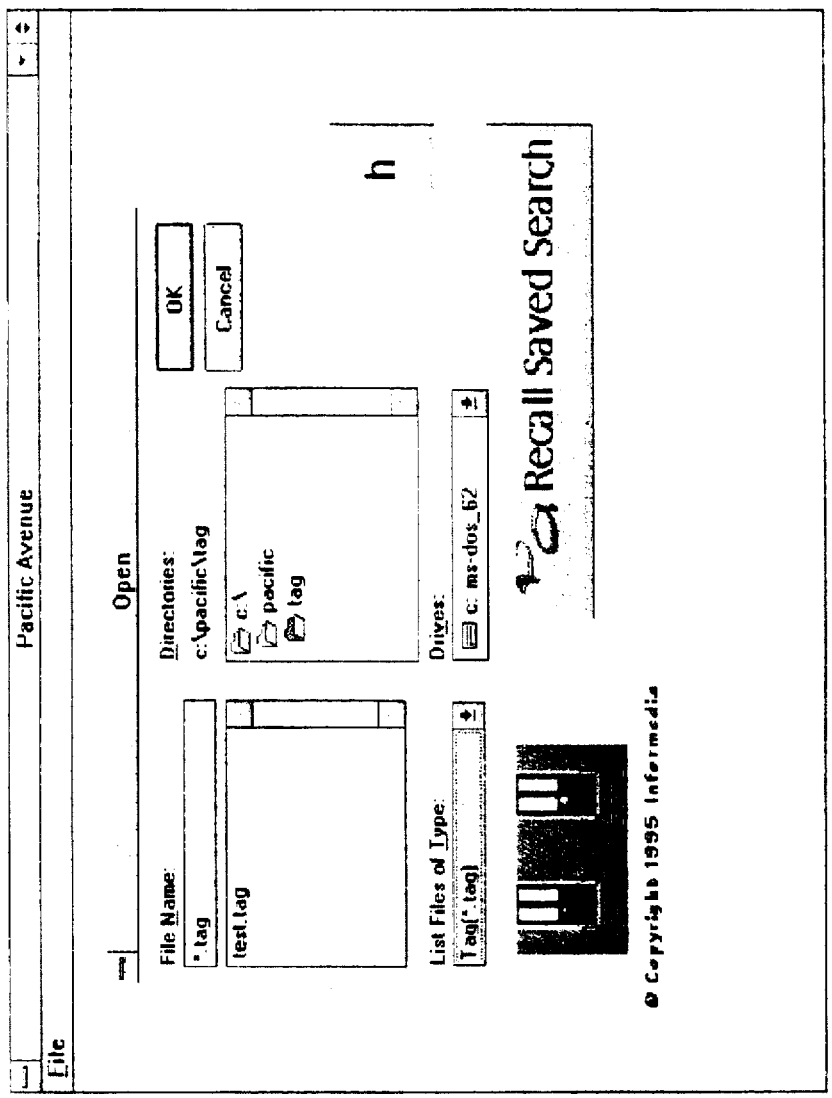
FIG. 23 is a screen display of a saved search window.

Referring back to FIG. 12, if the recall-saved-search icon is selected, then the user is presented with a screen display such as the one illustrated in FIG. 23. This allows the user to select a previously-tagged search, stored in the form of a file, for viewing. Searches can be tagged by selected the tag icon located on the screen displays illustrated in FIGS. 15–18.

Although illustrated in terms of houses, embodiments of the present invention may be utilized to store information about other types of buildings and/or real estate properties. Further, the data structure in accordance with embodiments of the present invention may be utilized in other, non-real-estate applications. Here, the exterior image can be any first image and the interior image can be any second image which are to be stored with hot spot information and textual information.

It should be noted that the present invention may be used in a wide variety of different constructions encompassing many alternatives, modifications, and variations which are apparent to those with ordinary in the art. Accordingly, the present invention is intended to embrace all such alternatives, modifications, and variations as fall within the spirit and broad scope of the appended claims.

What is claimed is:

1. A method of compiling information about a house on a computer-readable storage medium using a computer or other like programmable apparatus having a processor and a memory, the method comprising:

establishing a computer-readable database with a single database format on the computer-readable storage medium;

receiving textual information for the house;

receiving an exterior image of the house;

receiving an interior image of the house;

receiving at least one parameter indicating a portion of the exterior image corresponding to the interior image; and compiling the textual information, the exterior image, the interior image, and the at least one parameter into the computer-readable database.

2. The method of claim 1 wherein the computer includes a display device, and wherein receiving textual information for the house includes:

displaying a data entry template on the display device, the data entry template containing a plurality of fields;

receiving a signal to select one of the fields; and receiving textual data for the one of the fields.

3. The method of claim 1 wherein receiving an interior image includes receiving a plurality of interior images, wherein receiving the at least one parameter includes:

receiving a first signal to select one of the plurality of interior images;

receiving a second signal to select the portion of the exterior image corresponding to the one of the interior images; and determining a plurality of coordinates which define the portion of the exterior image based upon the second signal;

wherein compiling includes compiling the plurality of interior images and the plurality of coordinates into the computer-readable database.

4. The method of claim 1 further comprising receiving a floor plan image of at least a portion of the house, wherein compiling includes compiling the floor plan image into the computer-readable database.

5. The method of claim 1 wherein the textual information, the exterior image, the interior image, and the at least one parameter are stored as a single relational record in the computer-readable database.

6. The method of claim 1 wherein the portion of the exterior image includes a window of the house, and wherein the interior image is of a room of the house behind the window.

7. The method of claim 1 wherein the information about the house is contained in a single file on the computer-readable storage medium.

8. A system for compiling information about a house on a computer-readable storage medium using a computer or other like programmable apparatus having a processor and a memory, the system comprising:

means for establishing a computer-readable database with a single database format on the computer-readable storage medium;

means for receiving textual information for the house;

means for receiving an exterior image of the house;

means for receiving an interior image of the house;

means for receiving at least one parameter indicating a portion of the exterior image corresponding to the interior image; and means for compiling the textual information, the exterior image, the interior image, and the at least one parameter into the computer-readable database.

9. The system of claim 8 wherein the computer includes a display device, and wherein the means for receiving textual information for the house includes:

means for displaying a data entry template on the display device, the data entry template containing a plurality of fields;

means for receiving a signal to select one of the fields; and means for receiving textual data for the one of the fields.

10. The system of claim 8 wherein the means for receiving an interior image receives a plurality of interior images, and wherein the means for receiving the at least one parameter includes:

means for receiving a first signal to select one of the plurality of interior images;

means for receiving a second signal to select the portion of the exterior image corresponding to the one of the interior images; and means for determining a plurality of coordinates which define the portion of the exterior image based upon the second signal;

wherein the means for compiling compiles the plurality of interior images and the plurality of coordinates into the computer-readable database.

11. The system of claim 8 further comprising means for receiving a floor plan image of at least a portion of the house, wherein the means for compiling compiles the floor plan image into the computer-readable database.

12. The system of claim 8 wherein the textual information, the exterior image, the interior image, and the at least one parameter are stored as a single relational record in the computer-readable database.

13. The system of claim 8 wherein the portion of the exterior image includes a window of the house, and wherein the interior image is of a room of the house behind the window.

14. The system of claim 8 wherein the information about the house is contained in a single file on the computer-readable storage medium.

15. An article of manufacture used to direct a computer or other like programmable apparatus to compile information about a house on a first computer-readable storage medium, the article of manufacture comprising:

a second computer-readable storage medium; and a computer program represented as computer-readable data on the second computer-readable storage medium, the computer program directing the computer to perform:

establishing a computer-readable database with a single database format on the computer-readable storage medium;

receiving textual information for the house;

receiving an exterior image of the house;

receiving an interior image of the house;

receiving at least one parameter indicating a portion of the exterior image corresponding to the interior image; and compiling the textual information, the exterior image, the interior image, and the at least one parameter into the computer-readable database.

16. The article of manufacture of claim 15 wherein the computer includes a display device, and wherein receiving textual information for the house includes:

displaying a data entry template on the display device, the data entry template containing a plurality of fields;

receiving a signal to select one of the fields; and receiving textual data for the one of the fields.

17. The article of manufacture of claim 15 wherein receiving an interior image includes receiving a plurality of interior images, wherein receiving the at least one parameter includes:

receiving a first signal to select one of the plurality of interior images;

receiving a second signal to select the portion of the exterior image corresponding to the one of the interior images; and determining a plurality of coordinates which define the portion of the exterior image based upon the second signal;

wherein compiling includes compiling the plurality of interior images and the plurality of coordinates into the computer-readable database.

18. The article of manufacture of claim 15 wherein the computer program further directs the computer to perform receiving a floor plan image of at least a portion of the house, wherein compiling includes compiling the floor plan image into the computer-readable database.

19. The article of manufacture of claim 15 wherein the textual information, the exterior image, the interior image, and the at least one parameter are stored as a single relational record in the computer-readable database.

20. The article of manufacture of claim 15 wherein the portion of the exterior image includes a window of the house, and wherein the interior image is of a room of the house behind the window.

21. The article of manufacture of claim 15 wherein the information about the house is contained a single file on the computer-readable storage medium.

22. A device for storing information about a house for access by an application program executed on a computer or other like programmable apparatus, the device comprising:

a computer-readable storage medium; and computer-readable data on the computer-readable storage medium, the computer-readable data representative of a database containing textual information for the house, at least one exterior image for the house, at least one interior image for the house, and at least one parameter indicating a portion of the exterior image corresponding to the interior image for the house, all in a common database format.

23. The device of claim 22 wherein the at least one parameter for the house includes a plurality of coordinates which define the portion of the exterior image.

24. The device of claim 22 wherein the database further contains a floor plan image of at least a portion of the house.

25. The device of claim 22 wherein the database contains a plurality of records corresponding to a plurality of houses, and wherein the textual information, the at least one exterior image, the at least one interior image, and the at least one parameter for each house are stored as a single relational record in the database.

26. The device of claim 22 wherein the textual information, the at least one exterior image, the at least one interior image, and the at least one parameter for the house are contained in a single file on the computer-readable storage medium.

27. A device for storing information about a house for access by an application program executed on a computer or other like programmable apparatus, the device comprising:

a computer-readable storage medium; and computer-readable data on the computer-readable storage medium, the computer-readable data representative of a database containing textual information for the house, at least one exterior image for the house, at least one interior image for the house, a plurality of coordinates defining a portion of the exterior image corresponding to the interior image for the house, and a floor plan image of at least a portion of the house, all in a common database format and contained in a single file on the computer-readable storage medium.

* * * * *